(No Model.)
G. E. BURT.
CHAIN LINK FOR HORSE POWERS.
No. 283,751. Patented Aug. 28, 1883.
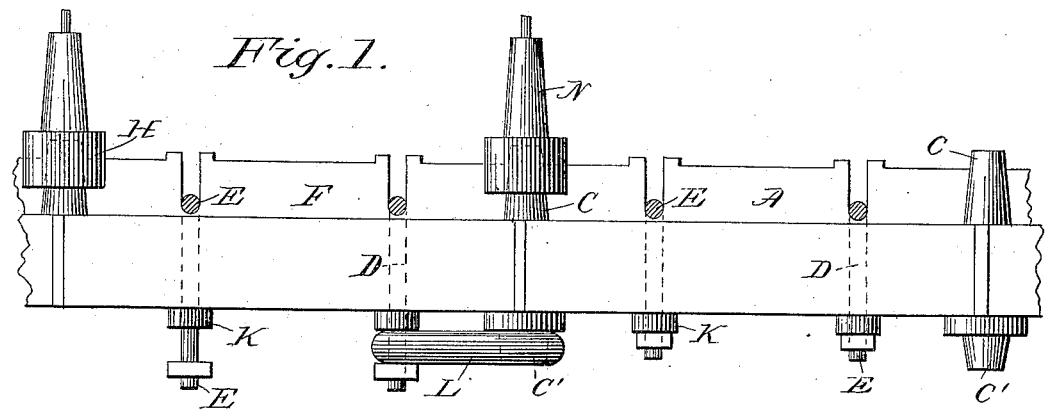
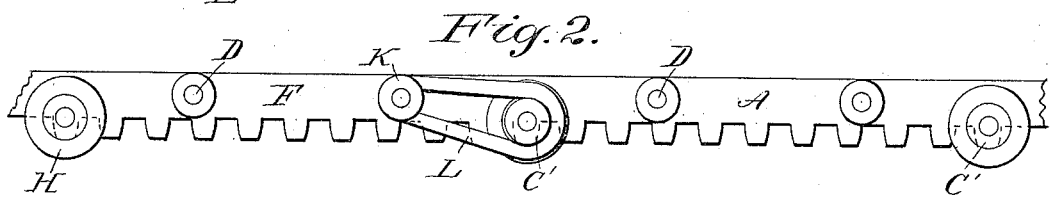
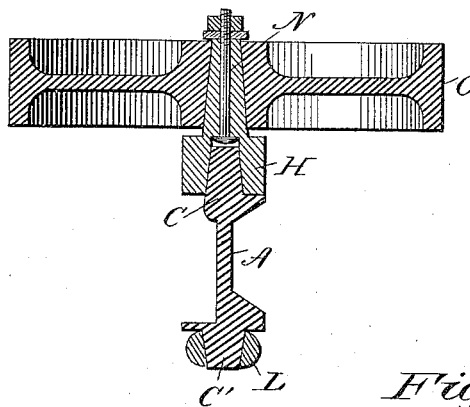
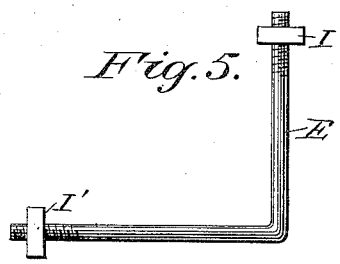
Witnesses
E. E. Burt.
A. C. Burt.
Inventor.
George E. Burt.
N. PETERS. Photo-Lithographer, Washington, D. C.

UNITED STATES PATENT OFFICE.

GEORGE E. BURT, OF HARVARD, MASSACHUSETTS.

CHAIN-LINK FOR HORSE-POWERS.

SPECIFICATION forming part of Letters Patent No. 283,751, dated August 28, 1883.

Application filed February 23, 1883. (No model.)

*To all whom it may concern:*

Be it known that I, GEORGE E. BURT, a citizen of the United States, residing at Harvard, in the county of Worcester and State of Massachusetts, have invented a new and useful Improvement in Chain-Links for Horse-Powers, of which the following is a specification.

My invention relates to improvements in links for endless-chain horse-powers; and it consists in the method of constructing a double connection for chilled pivots and their seats, so arranged as to hold the links in a line with each other, and also to strengthen the link in its weakest part; also, the manner of fastening the treads to the links with angle-bolts held firmly in position by the links, so they cannot drop out when the nuts are removed to renew the treads. The bolts are so secured that they cannot drop out and fall into the cogs when the machine is running.

Heretofore the endless chains to such horse-powers have been constructed with straight bolts to fasten the treads to the link. When the heads of the bolts are placed inward toward the gearing, the nuts are liable to become loosened by the strain and vibration caused by the labor of the horse running the machine, and to drop into the gearing and cause serious damage.

Heretofore when chilled pivots for the links have been used they were constructed with single connections, which are objectionable, as they do not hold the links in a line, and the cogs are liable to clash on the driving-gear, and they are not as strong as double connections.

The objects of my invention are to strengthen the chilled connections of horse-power chains with an auxiliary link, and thus construct a double connection; also, to attach the tread to the link with angle-bolts, which are held firmly in position and cannot drop out when the treads are being removed; also, to sustain the weight of the horse when propelling the machine. These bolts cannot work out when the machine is in use. I attain these objects by mechanism illustrated in the accompanying drawings, in which—

Figure 1 is a top view or plan, the supporting-wheel removed. Fig. 2 is a side view, showing the auxiliary link and connections. Fig. 3 is a transverse vertical section through the auxiliary double-pivoted connection, showing the chill-hardened pivots and their seats, also the supporting axle and wheel. Fig. 4 is a transverse section through the supporting angle-bolt, the tread, and link. Fig. 5 shows the angle-bolt.

Similar letters refer to similar parts throughout the several views.

Link A is constructed with two pivots, C C', also with seats D D for the angle-bolts E E. Link F is constructed with a chilled seat, H, for pivot C, also with seats D for the angle-bolts E. The supporting-axle N is cast on the link F, and may be constructed with a wrought metal start having a thread and nut to hold the supporting-wheel O on the axle, or may be cast with a core-hole to receive a bolt. (See Figs. 1, 3, and 4.) These links are provided with cogs and flanges to strengthen the link and propel the driving-gear, and are firmly held in position by the angle-bolt E on the tread J. (Seen in Fig. 4.) The chilled pivot C, being inserted into its chilled seat H, makes one connection between the links A and F, (seen in Figs. 1 and 2,) and the auxiliary link L, when in its position on chilled pivot C', and the boss K form a second connection, all held firmly in position by the nut I. One arm of the angle-bolt E being held firmly in its seat D, the other arm stands vertically, and the tread J being constructed with holes for the bolts E E, the treads are easily put onto the link without any liability of the bolts dropping out, and by turning down nut I' the tread and link are firmly secured and all the parts held together.

I am aware that double connections have been used in cast-iron links; but they have been made of soft iron drilled and pins inserted. The objection to this is, they are not durable, cost more, and the soft metal soon wears and lengthens the chain at the joints, causing the pitch of the cogs to vary and lengthen the space between the cogs at the pivoted joints in the chain, which cause the cogs in the chain to overlap the cogs in the driving-gear, and thus cause the machine to run hard, and finally break the links. I therefore do not claim a double connection, broadly; but

What I claim as my invention, and desire to secure by Letters Patent, is—

1. The combination of the auxiliary link L, the pivot C', and boss K, constructed and arranged substantially as described, for the purpose set forth.

2. In combination with links A and F, the auxiliary link L, the angle-bolt E, and the tread J, constructed substantially as described, for the purpose set forth.

3. The combination of the angle-bolt E, the links A F, and tread J, for the purpose set forth.

GEORGE E. BURT.

Witnesses:
E. E. BURT,
A. C. BURT.